Oct. 6, 1936.                W. D. FOSTER ET AL                2,056,846
                              FILM HANDLING APPARATUS
                            Original Filed May 31, 1930
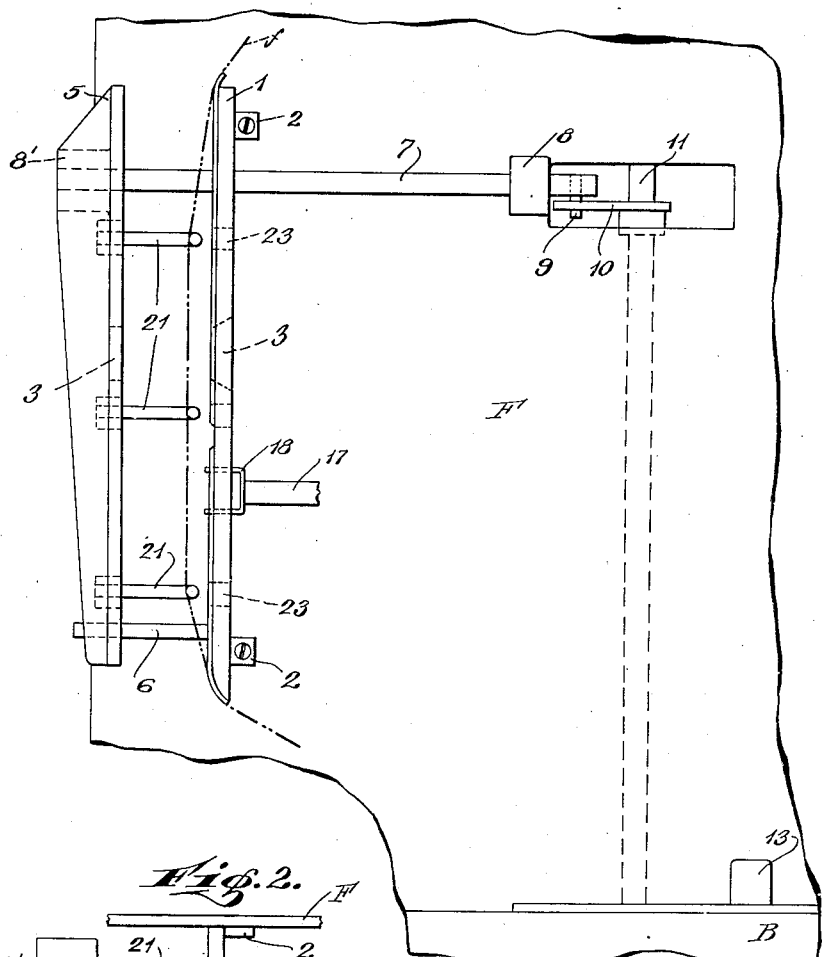
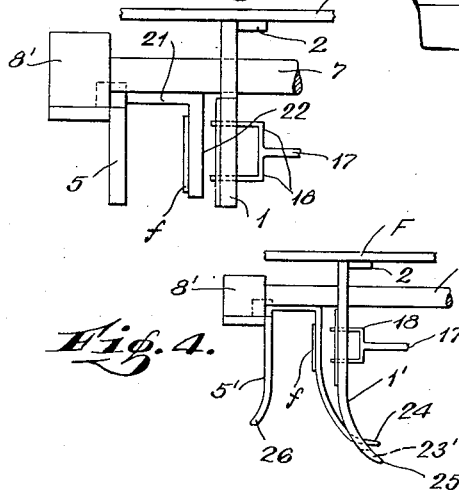
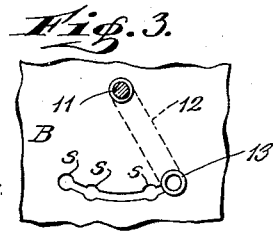
INVENTOR.
W. D. FOSTER
F. D. SWEET
BY Waldo G. Morse
ATTORNEY Patented Oct. 6, 1936

2,056,846

UNITED STATES PATENT OFFICE 2,056,846

FILM HANDLING APPARATUS

Warren Dunham Foster, Washington Township, Bergen County, N. J., and Frederick Davenport Sweet, New York, N. Y., assignors, by direct and mesne assignments, to Kinatome Patents Corporation, New York, N. Y., a corporation of New York Continuation of application Serial No. 458,537, May 31, 1930. This application August 6, 1932, Serial No. 627,788

3 Claims. (Cl. 88—17)

The present invention relates broadly to any art in which a film or other material of similar characteristics is fed, whether in apparatus adapted for the taking or projection of pictures, or in apparatus adapted for the recordation or reproduction of sound, either alone or in conjunction with images of things, or in apparatus of other types.

This application is a continuation of our application, Serial Number 458,537, filed May 31, 1930, which was filed as a continuation in part of our co-pending application, Serial Number 345,716, filed March 9, 1929.

An object of the present invention is the provision of a greatly simplified mechanism for the bodily removal of the film from the feeding member, its protection therefrom, and its guidance in reference thereto and to the gate during the initial positioning thereof or preliminary to the removal thereof, such mechanism preferably being operated by the opening or closing of the gate.

In the application of Herbert George Ponting and George William Ford, Serial Number 392,890, filed September 16, 1929, which was a division of application Serial Number 542,898, filed March 11, 1922, which divisional application matured upon November 19, 1929, as Patent Number 1,736,730, which Ponting and Ford applications were co-pending with the parent application hereof, there is described and claimed a film removing member which engages the film at one point adjacent the feeding member and removes it therefrom, such point of engagement being outside of the area between the movable and fixed sections of the gate. One of the objects of the present invention is to improve upon such invention by providing a plurality of film removing members which operate upon both sides of the feeding member and preferably at one or more additional points in the film track so that the film is positively, quickly and easily pulled from the teeth of the feeding member. Such film removing members preferably are so positioned that they operate entirely within the area of the gate and through appropriate openings in the fixed gate section thus cooperating most closely with the gate in freeing the film therefrom, as well as from the moving member, and in guiding the film relatively thereto. In a preferred modification, the film removing and protecting members are constructed and positioned so that when the gate is open they directly cooperate with one of the gate sections to form a common guiding surface which easily and certainly guides the film into its proper position relative to the entire gate and the moving member also. The present application has for another of its objects the provision of film removing means of a type which will be particularly effective for use with a film feeding member of the intermittent grip type, although its utility is in no way limited in such respect.

Another object of the present invention is the provision of an auxiliary gate member, articulated with the movable section of the gate, effective to form a film path or channel, auxiliary to the regular feeding path or channel, which auxiliary path is useful in the initial positioning of the film in the gate or prior to its removal therefrom.

A particular object of the present invention is the provision of film removing, protecting and guiding means which will be highly effective, but can be produced at the absolute minimum of expense.

Other objects, advantages and characteristics are apparent in the following description, the attached drawing and the subjoined claims. Although we are showing one preferred embodiment of our invention, it will be readily understood that we are not limited to any particular construction as changes can readily be made without departing from the spirit of our invention or the scope of our broader claims.

In the drawing:

Figure 1 is a right side elevation of the gate, control means therefor, and film removing mechanism, the gate being open;

Figure 2 is a cross section of Figure 1;

Figure 3 is a view of a portion of control means adapted to operate the gate;

Figure 4 corresponds to Figure 2, and shows a preferred modification.

In carrying out our invention, there is preferably mounted on the front side of the frame F a fixed gate section 1 secured in any desired manner as by the lugs 2 against movement relatively to the frame. This section is preferably formed with an aperture 3, through which light may be passed as is well understood in the art. Cooperating with the section 1, is a relatively movable section 5 preferably guided by a pin 6 projecting outwardly from the section 1, and, by means of the boss 8', secured to one end of a gate opening rod 7 slidable through a suitable opening in the gate section 1 and a suitable bearing 8 on the frame F. By reason of this construction, it will be apparent that when the rod 7 is moved to the right as viewed in the drawing, it will be effective for moving the section 5 toward the section 1 and into cooperative relation therewith, while movement in the opposite direction will move the section 5 away from section 1 to permit the removal of a film and the insertion of another film.

In accordance with conventional practice, the usual pressure plate and relieved film channel may be provided.

In order to move such rod 7, a pin 9 may be affixed to the right hand end thereof, as viewed in Figure 1, and cooperate with an appropriate slot in the link 10 which is attached to the gate control shaft 11, which may be suitably mounted upon the rearward side of the frame F. As will be apparent by reference to Figure 3, such shaft may be rotated through the medium of the link 12 attached to the lower end thereof and the button 13 which may project above the base B of the apparatus.

A plurality of operating stations, S (Figure 3) may be constructed by enlarging the arcuate slot through which the button 13 moves, and appropriate means such as are shown in our copending application now Patent Number 1,993,735, dated March 12, 1935, provided for locking the button B at any one of such stations.

For effecting the desired intermittent feeding motion of a film through the gate, there may be provided a feeding member 17 having film engaging teeth 18 adapted to engage apertures in the film *f*. Such member may be driven in any suitable manner, not shown.

As clearly shown in the drawing, a plurality of fingers 21 are attached to the movable gate section 5 and extend therefrom toward the fixed gate section 1. These figures are positioned to the rear of the film track between such track and the main frame F. At the right hand extremity, as viewed in Figures 1 and 2, such fingers are bent at right angles to the main body portion and include an extension 22. Openings 23 are provided in the fixed gate section 1 through which the fingers operate when in the manner previously described the movable section 5 is moved into cooperative relation with the fixed section 1 to close the gate.

In one simple form these fingers may comprise merely hooks of bent wire.

Owing to the provision of a plurality of members, the film *f* will be drawn directly away from the teeth 18 of the moving member 17 when the gate is opened in the manner previously described. Such direct movement obviously removes the film from the teeth and from contact with the fixed gate section with practically speaking no possibility of injury to the film. Such construction is particularly useful in drawing the film from teeth of a moving member of the intermittent grip type, although they are also very useful in connection with a sprocket. When the gate is open, such fingers protect the film from the teeth 18 of the feeding member 17, and also cooperate with the movable section 5 to form an auxiliary film path which is useful in connection with the initial positioning of the film in the apparatus or its removal therefrom.

In the preferred embodiment of the invention shown in Figure 4, the right angled extension 22 is still further extended to form a portion 24 which in an easy curve coacts with a curved guiding extension 25 of the fixed gate section 1'. By reference to Figure 4, it will be seen that when the gate is in the open position there shown and a film is to be placed therein by movement in a direction lateral to the path of the film through the gate, this curved portion 24 will cooperate with the curved extension 25 of the fixed section 1 and the curved guiding extension 26 of the movable section 5 to guide the film easily and surely into its proper position. It will be noted that the end of film positioning member passes through the opening 23' in the fixed gate section 1' when the gate is open for threading the film. Thus the film is initially guided by the gate section itself and thereafter by the side of the curved portion 24 of the finger 21. In practice the entire fixed gate section 1 can be made in the form of a single stamping with openings into which the ends of the fingers 21 fit when the gate is open and through which they are moved when the gate is closed. Each of the fingers 21 may be stamped and formed in one operation from relatively inexpensive material.

If desired, the gate section 5 and the finger 21, whether of the type shown in Figure 2 or Figure 4, may be formed from one piece of metal in a single stamping and bending operation, the fingers, in such case, being wider than those shown in the drawing, and a pressure plate may be mounted upon the metal remaining between the portions which are cut out to form the fingers, such pressure plate when the gate is closed obviously being in continuous contact with the film at all points opposite the fixed plate 1.

It will be evident that our invention may be applied to any type of film handling apparatus, although in this specification it is described as applied to a projector or camera. In this specification, our invention has been described as applied to a film handling apparatus into which the film is introduced by a movement lateral to its ordinary path of travel therethrough, but it is obvious that in many particulars it is likewise adapted for use in apparatus constructed for so-called "endwise threading".

Certain of the advantages of the present invention have been set forth in the preceding portion of this specification.

Other advantages include the provision of a simplified, efficient, and inexpensive film removing guiding and protecting member, and mechanism for operating the same.

Other advantages include the provision of an inexpensive stripping element fixed to the movable gate section and serving to protect the film from the teeth of the moving element as well as to strip it therefrom.

Other advantages include the provision of a film removing, protecting or guiding element which when the gate is open is arranged to form an auxiliary film track and to guide the film into a predetermined position within the gate and when the gate is closed is positioned outside of the area of the gate and out of contact with the film.

We claim:

1. In a film handling apparatus, a gate including a fixed section and a section parallel and movable relatively thereto, means for moving said movable section between a first or open-gate position in which said movable section is disposed in parallel and distant relation to said fixed section so that a film may be initially positioned between said sections and a second or gate closed position in which said movable section is disposed in parallel and adjacent relation to said fixed section thereby defining a path through which the film may be fed, a toothed feeding member extending through an opening in said fixed section, said fixed section being provided with such an opening, and into the space which intervenes between said sections when said movable section is disposed in said second or gate-closed position for feeding the film along said path, the relative position between the ends of the teeth of said feeding member and the location of said movable gate-section when said movable section is disposed in said first or gate-open position being such that space intervenes therebetween, and protective means, said protective means including a first film engaging member mounted upon one side of said feeding member and when said movable section is disposed in said first or gate-open position being movable from a position outside of the area between said gate sections to a protective position within said space intervening between the ends of the teeth of said feeding member and said movable gate section whereby the film is protected from said teeth, a second and complementary film engaging member similarly mounted upon the other side of said film engaging member and movable to a position similarly spaced from the ends of said teeth and said movable gate section so that it cooperates with said first film engaging member to form two points of a threading channel which is parallel to both of said gate sections and to protect the film upon both sides of said feeding member and irrespective of the direction of its longitudinal movement into or through the open gate, and a connection between said film engaging members and said movable gate section for moving said film engaging members to said above mentioned position upon the movement of said movable gate section to said first or open-gate position.

2. Apparatus according to claim 1, both of said film engaging members being mounted for movement from and to protective position through openings in said fixed gate section, said fixed gate section being provided with such openings.

3. In a film handling apparatus, a frame, a gate extending from said frame and comprising a fixed section and a section movable relatively thereto, said sections being constructed to define a path therebetween through which a film is fed, a claw for feeding the film through such path, said claw being arranged to project through said fixed gate section into such path, a member disposed between said sections for bodily removing the film from said claw, said member being attached to said movable gate section and extending therefrom around the edge of such film path adjacent said frame and to the side thereof relatively distant from said movable section and being positioned relatively near to said claw, and means for releasably locking said film removing member in its operative position.

WARREN DUNHAM FOSTER.
FREDERICK DAVENPORT SWEET.